US009742675B2

(12) United States Patent
Ansari et al.

(10) Patent No.: US 9,742,675 B2
(45) Date of Patent: Aug. 22, 2017

(54) MANAGEMENT OF BANDWIDTH EFFICIENCY AND FAIRNESS IN CLOUD COMPUTING

(71) Applicant: New Jersey Institute of Technology, Newark, NJ (US)

(72) Inventors: Nirwan Ansari, Montville, NJ (US); Xiang Sun, Harrison, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 133 days.

(21) Appl. No.: 14/353,266

(22) PCT Filed: Nov. 29, 2013

(86) PCT No.: PCT/US2013/072479
§ 371 (c)(1),
(2) Date: Apr. 21, 2014

(87) PCT Pub. No.: WO2015/080749
PCT Pub. Date: Jun. 4, 2015

(65) Prior Publication Data
US 2015/0156114 A1  Jun. 4, 2015

(51) Int. Cl.
*G06F 15/16* (2006.01)
*H04L 12/801* (2013.01)

(52) U.S. Cl.
CPC ................... *H04L 47/12* (2013.01)

(58) Field of Classification Search
CPC ...................................... H04L 47/12
USPC ........ 709/235, 233, 226; 370/468, 234, 235, 370/225, 236, 230
See application file for complete search history.

(56) References Cited

U.S. PATENT DOCUMENTS

| 6,359,863 | B1* | 3/2002 | Varma | 370/232 |
| 7,200,110 | B1* | 4/2007 | Burns | 370/225 |
| 2002/0002646 | A1* | 1/2002 | Jeddeloh | G06F 13/36 710/113 |

(Continued)

FOREIGN PATENT DOCUMENTS

WO  2011123868 A1  10/2011

OTHER PUBLICATIONS

Anwer, M.B., et al., "Network I/O Fairness in Virtual Machines," Proceedings ACM SIGCOMM workshop on Virtualized infrastructure systems and architectures, pp. 73-80, Sep. 2010.

(Continued)

*Primary Examiner* — Thuong Nguyen
(74) *Attorney, Agent, or Firm* — Turk IP Law, LLC

(57) ABSTRACT

Technologies are generally described to manage bandwidth efficiency and fairness in cloud computing. According to some examples, bottleneck links may be determined in a network connecting communication device pairs. A first bandwidth allocation may be determined of a first subset of the communication device pairs communicating through the bottleneck links. A second bandwidth allocation may be determined of a second subset of the communication device pairs unable to communicate through the bottleneck links. Then, the first bandwidth may be adjusted based on an analysis of the first bandwidth, the second bandwidth, a first weight attribute associated with the first subset and a second weight attribute associated with the second subset.

23 Claims, 6 Drawing Sheets

(56) References Cited

U.S. PATENT DOCUMENTS

| | | | |
|---|---|---|---|
| 2003/0018788 A1* | 1/2003 | Zsohar | H04L 63/0209 |
| | | | 709/227 |
| 2003/0026290 A1* | 2/2003 | Umayabashi | H04L 12/5601 |
| | | | 370/468 |
| 2006/0120288 A1* | 6/2006 | Vasseur | H04L 45/04 |
| | | | 370/235 |
| 2006/0250986 A1 | 11/2006 | Alharbi et al. | |
| 2008/0155087 A1 | 6/2008 | Blouin et al. | |
| 2012/0316696 A1 | 12/2012 | Boardman et al. | |
| 2013/0275707 A1 | 10/2013 | Schenfeld et al. | |
| 2013/0286846 A1* | 10/2013 | Atlas | H04L 45/34 |
| | | | 370/236 |
| 2014/0068076 A1* | 3/2014 | Dasher | H04L 65/4076 |
| | | | 709/226 |
| 2014/0126358 A1* | 5/2014 | Bedekar | H04W 28/24 |
| | | | 370/230 |
| 2014/0314099 A1* | 10/2014 | Dress | H04L 45/62 |
| | | | 370/422 |

OTHER PUBLICATIONS

Ballani, H., et al., "Chatty Tenants and the Cloud Network Sharing Problem," 10th USENIX Symposium on Networked Systems Design and Implementation, pp. 171-184, Apr. 2013.

Briscoe, B., "Flow Rate Fairness: Dismantling a Religion," Computer Communication Review, vol. 37, No. 2, pp. 63-74, Apr. 2007.

Chen, Y., et al., "BigPi: Sharing Link Pools in Cloud Networks," pp. 12 (2013).

Dolev, D., et al., "No Justified Complaints: On Fair Sharing of Multiple Resources," Proceedings Innovations in Theoretical Computer Science Conference (ITCS 2012), pp. 68-75, Jan. 2012.

Gabale, V., et al., "Insite: QoE-Aware Video Delivery from Cloud Data Centers," Proceedings 2012 IEEE 20th International Workshop on Quality of Service (IWQoS), pp. 9, Jun. 2012.

Kim, H., et al, "Task-aware virtual machine scheduling for I/O performance," Proceedings 2009 ACM SIGPLAN/SIGOPS International Conference on Virtual Execution Environments, pp. 101-110, Mar. 2009.

Kuribayashi, S., "Optimal Joint Multiple Resource Allocation Method for Cloud Computing Environments," International Journal of Research & Reviews in Computer Science, vol. 2, No. 1, pp. 1-8, Mar. 2011.

Lee, H-W., and Chong, S., "A distributed utility max-min flow control algorithm," Computer Networks, vol. 50, No. 10, pp. 1816-1830, Aug. 2006.

Mell, P., and Grance, T., "The NIST definition of cloud computing," National Institute of Standards and Technology (NIST), Special Publication 800-144, pp. 80, Sep. 2011.

Popa, L., et al., "FairCloud: Sharing the network in could computing," Proceedings ACM SIGCOMM, pp. 12, Aug. 2012.

Popa, L., etr al., "ElasticSwitch: Practical Work-Conserving Bandwidth Guarantees for Cloud Computing," Proceedings of the ACM SIGCOMM 2013 conference on SIGCOMM, pp. 351-362, Aug. 2013.

Rodrigue, H., et a., "Gatekeeper: Supporting Bandwidth Guarantees for Multi-tenant Datacenter Networks," Proceedings of the 3rd conference on I/O virtualization, pp. 8, May 2011.

Shieh, A., et al., "Sharing the Data Center Network," Proceedings 8th USENIX on networked System Design and Implementation, pp. 14 (2011).

Takuro, T., and Kuribayashi, S., "Congestion control method with fair resource allocation for cloud computing environments," 2011 IEEE Pacific Rim Conference on Communications, Computers and Signal Processing (PacRim), pp. 1-6, Aug. 2011.

International Search with written Opinion for International Application No. PCT/US2013/072479 mailed on Feb. 24, 2014.

Sun, X., and Ansari, N., "Improving Bandwidth Efficiency and Fairness in Cloud Computing," IEEE Conference on Global Communications, pp. 2313-2318 (Dec. 9-13, 2013).

* cited by examiner

MANAGEMENT OF BANDWIDTH
EFFICIENCY AND FAIRNESS IN CLOUD
COMPUTING

CROSS-REFERECE TO RELATED APPLICATION

This Application is the U.S. National Stage filing under 35 U.S.C. §371 of International Application No. PCT/US13/72479, filed on Nov. 29, 2013. The International application is hereby incorporated by reference in its entirety.

BACKGROUND

Unless otherwise indicated herein, the materials described in this section are not prior art to the claims in this application and are not admitted to be prior art by inclusion in this section.

Resource sharing in a cloud network may be classified into two major types including virtual machine (VM) based and network based. VM based sharing may focus on how to fairly map limited physical resources, such as CPU, RAM and network card, into different VMs. Network-based sharing may focus on how to assign the bandwidth proportional to the weight of different customers. While some approaches focus on how to map physical resources into VM fairly, few address how to share the network bandwidth according to the network topology.

Legacy approaches to resource sharing in cloud networks generally attempt to realize quality of experience (QoE) fairness of video delivery in cloud datacenters. Such approaches may define the QoE fairness as the number and duration of play out stalls in the video delivery process proportional to the flow weight. Such approaches may use buffer size of the client side and the Transport Control Protocol (TCP) window size as the flow weight. However, the number and duration of play out stalls proportional to the flow weight may not translate to customers' bandwidth gain proportional to the weight of the customers in cloud computing. As such, the legacy approaches may not be applicable in cloud networks.

SUMMARY

The present disclosure generally describes methods, apparatus, systems, devices, and/or computer program products related to management of bandwidth efficiency and fairness in cloud computing.

According to some examples, a method is provided to manage bandwidth efficiency and fairness in cloud computing. An example method may include determining bottleneck links in a network connecting communication device pairs, determining a first bandwidth allocation of a first subset of the communication device pairs communicating through the bottleneck links, determining a second bandwidth allocation of a second subset of the communication device pairs which do not communicate through the bottleneck links, and adjusting the first bandwidth based on an analysis of the first bandwidth, the second bandwidth, a first weight attribute associated with the first subset and a second weight attribute associated with the second subset.

According to other examples, an apparatus including a processor is provided to manage bandwidth efficiency and fairness in cloud computing. The apparatus may include a bandwidth management module configured to manage bandwidth of network nodes and a processor coupled to the bandwidth management module. The processor may be configured to determine bottleneck links in a network connecting communication device pairs, wherein the bottleneck links include at least one from a set of a core link, an aggregate link, and a rack link, determine a first bandwidth allocation of a first subset of the communication device pairs communicating through the bottleneck links, determine a second bandwidth allocation of a second subset of the communication device pairs unable to communicate through the bottleneck links, and adjust the first bandwidth based on an analysis of the first bandwidth, the second bandwidth, a first weight attribute associated with the first subset and a second weight attribute associated with the second subset.

According to some examples, a system including a controller is provided to manage bandwidth efficiency and fairness in cloud computing. The controller may be configured to determine bottleneck links in a network connecting communication device pairs, wherein the bottleneck links include at least one from a set of a core link, an aggregate link, a rack link, and the core link is a parent link of the aggregate link, and the aggregate link is another parent link of the rack link, determine a first bandwidth allocation of a first subset of the communication device pairs communicating through the bottleneck links, determine a second bandwidth allocation of a second subset of the communication device pairs unable to communicate through the bottleneck links, and adjust the first bandwidth based on an analysis of the first bandwidth, the second bandwidth, a first weight attribute associated with the first subset, and a second weight attribute associated with the second subset.

According to some examples, a computer readable medium may store instructions to manage bandwidth efficiency and fairness in cloud computing. The instructions may cause a method to be performed when executed by a processor, the method being similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
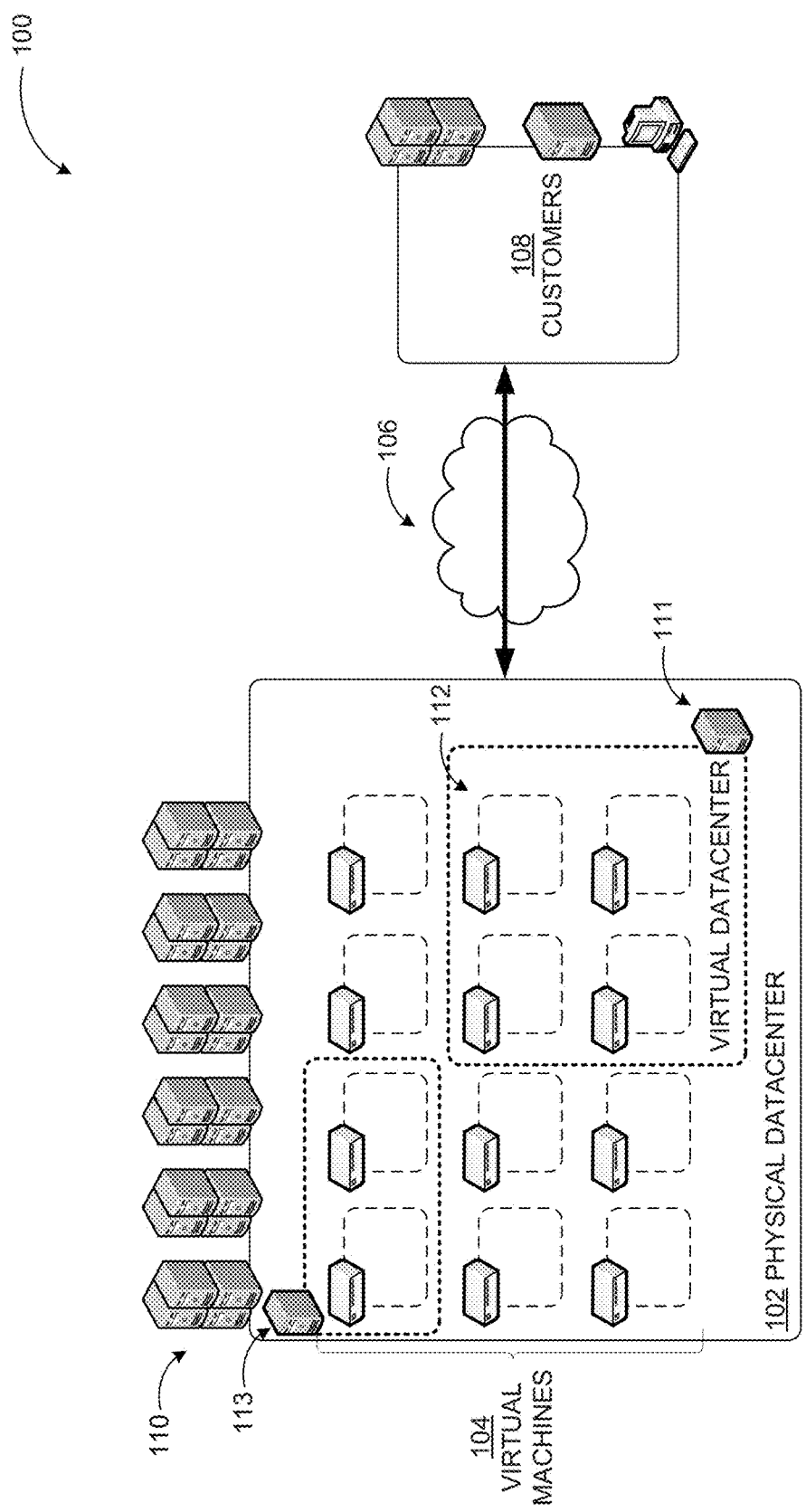
FIG. 1 illustrates an example schema to manage bandwidth efficiency and fairness in cloud computing.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to management of bandwidth efficiency and fairness in cloud computing.

Briefly stated, technologies directed to management of bandwidth efficiency and fairness in cloud computing are described. According to some examples, bottleneck links may be determined in a network connecting communication device pairs. A first bandwidth allocation may be determined of a first subset of the communication device pairs communicating through the bottleneck links. A second bandwidth allocation may be determined of a second subset of the communication device pairs unable to communicate through the bottleneck links. Then, the first bandwidth may be adjusted based on an analysis of the first bandwidth, the second bandwidth, a first weight attribute associated with the first subset and a second weight attribute associated with the second subset.

FIG. 1 illustrates an example schema to manage bandwidth efficiency and fairness in cloud computing, arranged in accordance with at least some embodiments described herein.

As depicted, a diagram 100 shows components of a datacenter configured to provide services to customers 108. A physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via one or more network such as a network 106.

Embodiments described herein are directed to establishment of a proportional fairness between customers in a cloud network and management of a bandwidth efficiency of one or more links between communication device pairs associated with the customers. Communication device pairs may include two end nodes communicating through the network 106.

Legacy solutions such as proportional sharing at network level (PS-N) approaches may administer proportional fairness between communication device pairs in the cloud network. However, the PS-N approaches may fail to administer the proportional fairness in scenarios including network oversubscription. In addition, bandwidth efficiency of a link may not be valued sufficiently highly within scenarios, which include PS-N use as a bandwidth allocation policy of the communication device pairs. Active management of bottleneck links may be used to overcome deficiencies of PS-N to satisfy customer demand for the proportional fairness of the bandwidth allocation.

According to some embodiments, a bottleneck link may include a link between the communication device pairs that has decreased available bandwidth and increased data traffic through the link. The link may include any direct connection between two devices routing the communication between the communication device pairs. The bottleneck link, $L_{bottleneck}$, may be defined by:

$$L_{bottleneck} = \min\left\{\frac{\text{The capacity of link } L}{\text{The total weight on link } L}, L \in \{L_1, L_2 \ldots L_n\}\right\}, \quad (1)$$

where L represents links between communication device pairs in the network.

The weight of the link may be proportional to a traffic load on the link. Initially, a bandwidth may be allocated to the communication device pairs on the bottleneck link. Next, the bandwidth may be assigned to other links associated with the communication device pairs proportional to weights associated with the communication device pairs. In addition, assignment of the bandwidth may be increased to other communication device pairs that are unable to communicate through the bottleneck link.

Figure 2:
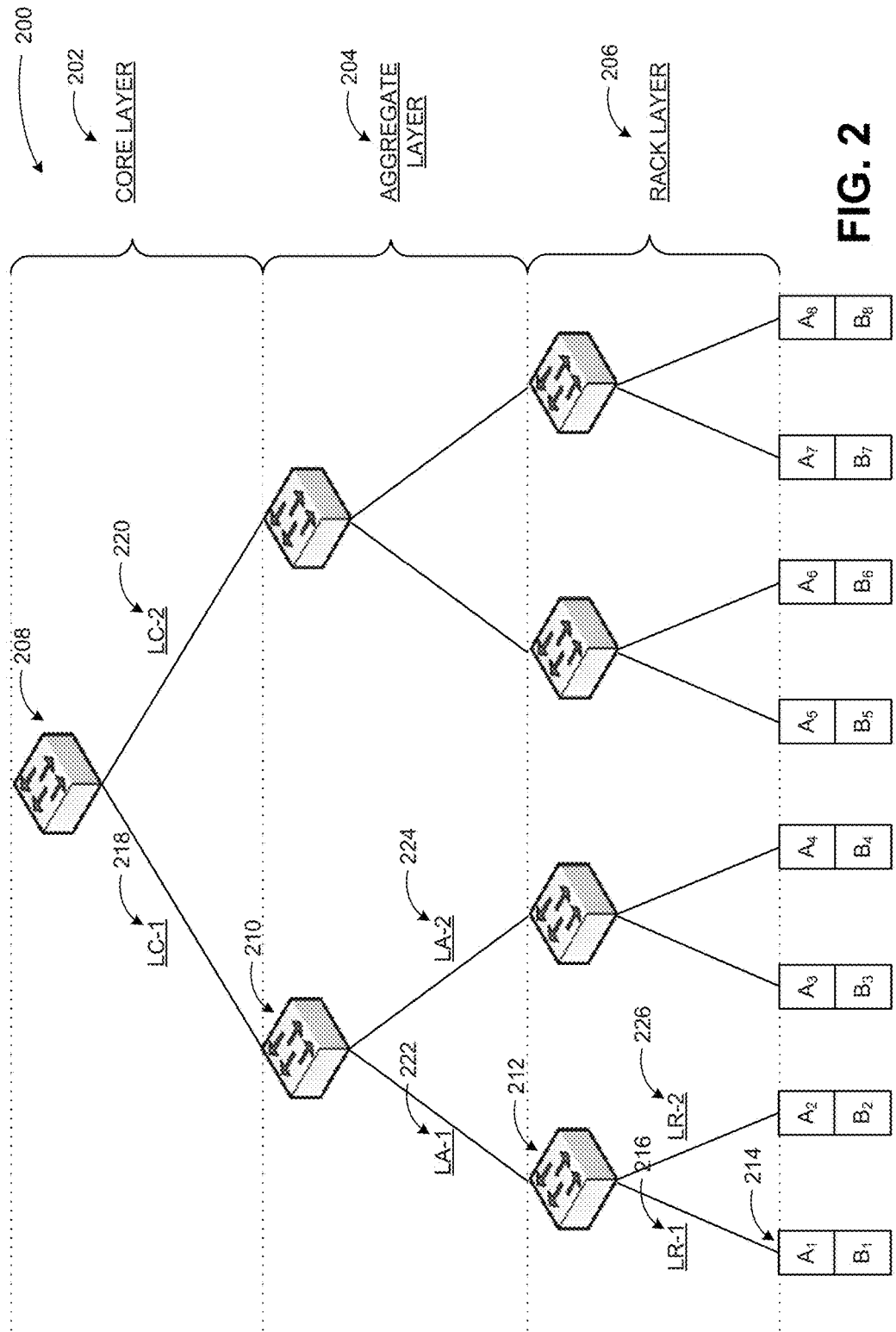
FIG. 2 illustrates example components of a scheme to manage bandwidth efficiency and fairness in cloud computing.

FIG. 2 illustrates an example of components of a scheme to manage bandwidth efficiency and fairness in cloud computing, arranged in accordance with at least some embodiments described herein.

As depicted in a diagram 200, a tree-based topology may identify components of a network managing bandwidth allocation through bottleneck links. A PS-N approach may use a weight model of a communication between a VM X and a VM Y. VM X and a VM Y (referred to as VM X(Y)) may be an example of a communication device pair. PS-N may compute a weight of VM X(Y) as:

$$W_{X-Y} = \frac{W_X}{N_X} + \frac{W_Y}{N_Y} \quad (2)$$

in which $N_x$ or $N_y$ may be a number of other VM(s) in communication with X or Y within a network. $W_x$ or $W_y$ may be the weight of VM X or VM Y.

$C_m$ may be a communication device pair communicating through a link $L_m$. A bandwidth allocated to another communicate device pair $i \leftrightarrow j$ of a customer of the link $L_m$ may be expressed as:

$$BW_{i \leftrightarrow j/L_m} = \frac{W_{i-j}}{W_{total/L_m}} \times BW_{available/L_m} \quad (3)$$

in which $BW_i\leftrightarrow_j/L_m$ may be the bandwidth assigned to the communication device pair between $VM_i$ and $VM_j$ on link $L_m$. $W_{i\text{-}j}$ may be a total weight of all communication device pairs on link $L_m$.

There may be n customers of the datacenter hosting the communication device pairs. Each customer may have a set of V communication device pairs. As such, $W_{total/Lm}$ may be expressed as:

$$W_{total/L_m} = \sum_{x=1}^{n}\left(\sum_{i,j\in V_X \& i\neq j \& i\leftrightarrow j\in C_m}\left(\frac{W_{x_i}}{N_{x_i}}+\frac{W_{x_j}}{N_{x_j}}\right)\right) \quad (4)$$

If the communication device pair $i\leftrightarrow j$ communicate through N links within the network, the bandwidth allocated to $i\leftrightarrow j$ ($BW_{i\text{-}j}$) may be:

$$BW_{i\text{-}j}=\min(BW_{i\text{-}j\in C_1}, BW_{i\text{-}j\in C_2}\ldots BW_{i\text{-}j\in C_m}\ldots BW_{i\text{-}j\in C_N}) \quad (5)$$

In the diagram 200, the example network may have the tree-based topology with eight servers and two customers A and B 214. Each customer may operate one VM in each server. A communication pattern of VMs for the customer A may be $A_i\leftrightarrow A_j$ $i\neq j$, $i,j=\{1, 2, 3 \ldots 8\}$). A communication type of VMs for customer B may be $B_i\leftrightarrow B_j$ ($i=j\pm 4$, $i=\{1, 2, 3 \ldots 8\}$). Each VM may have a unit weight. Each VM may also have an infinite amount of data to transmit to each other (that is, infinite bidirectional communication task). A core switch 208 and an aggregate switch 210 may be established so that a bottleneck link of the network may be at a rack layer 206 connected to a core switch 212. A switch, as used herein, may refer to a hardware device routing network traffic.

In the example scenario of the diagram 200, a weight of every communication device pair of the customer A may be 1/7+1/7=2/7. A weight of every communication device pair of the customer B may be 1+1=2. In an example scenario involving link LR-1 (216), there may be eight communication device pairs on LR-1 (216). The customer A may have seven links and the customer B may have one link so that WA:WB=1:1. If the link capacity of LR-1 is C, then customers A and B 214 may receive C/2 bandwidth. Based on equation (2), the customers and the communication device pairs may receive a proportional fairness based on PS-N.

In an example scenario, the core layer 202 and the aggregate layer 204 may be oversubscribed by two times. In the oversubscription scenario, links associated with the core layer 202 may become the bottleneck links. A total bandwidth allocated to the customers A and B 214 may be equivalent because the PS-N approach may allocate the bandwidth to the communication device pairs based on the rack layer 206. Allocation of the bandwidth based on the rack layer 206 may not conform to equation (5). A bandwidth value of the communication device pairs communicating through the core switch 208 may be decreased in response to the core switch 208 having the bottleneck link(s). As such, the bandwidth allocation by PS-N may not adhere to equation (3) at the rack layer 206.

Figure 3:
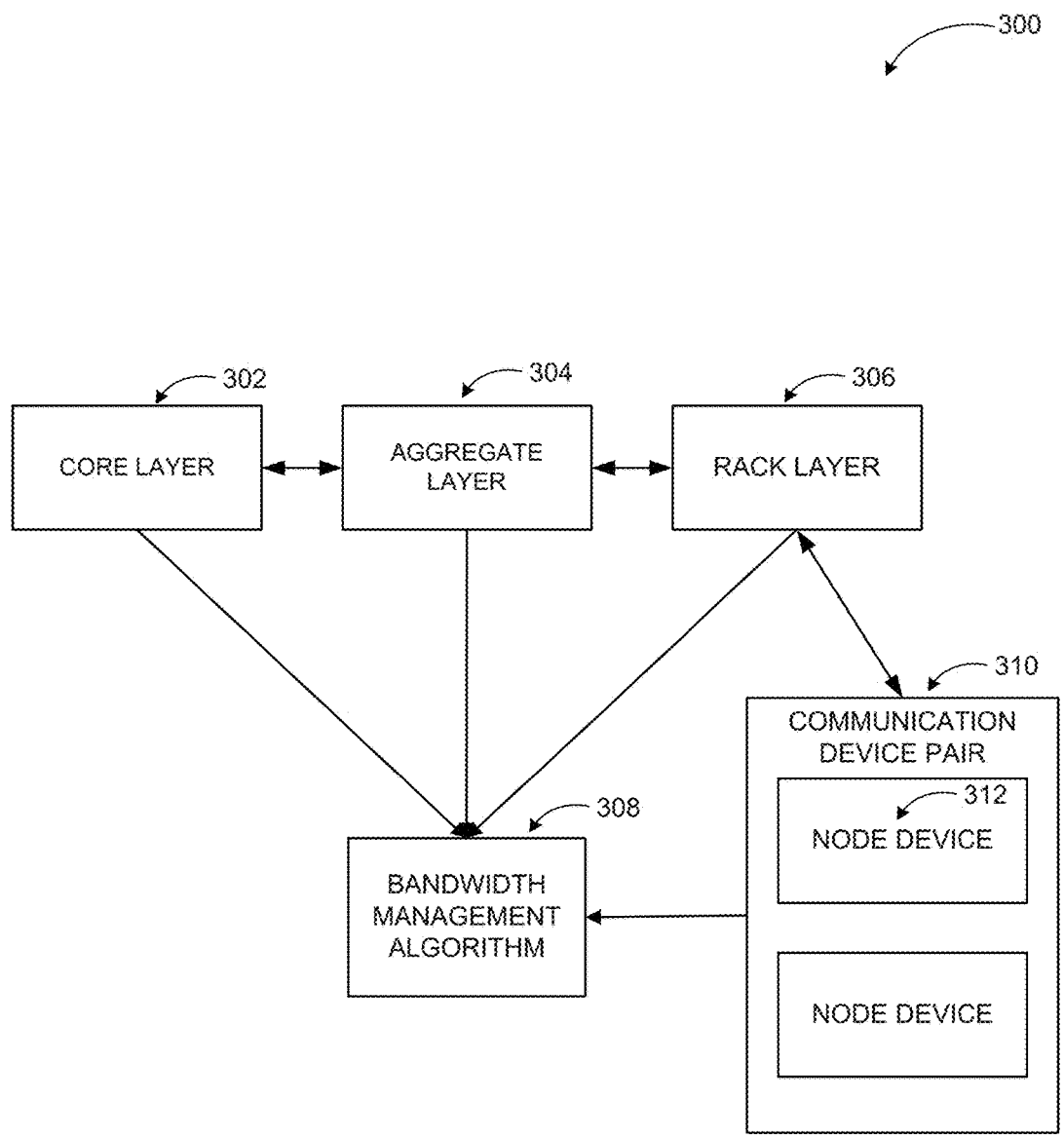
FIG. 3 illustrates an example of a scheme to manage bandwidth efficiency and fairness in cloud computing.

FIG. 3 illustrates an example scheme to manage bandwidth efficiency and fairness in cloud computing, arranged in accordance with at least some embodiments described herein.

As depicted in a diagram 300, a bandwidth management approach 308 may be configured to manage links of a network communicating data traffic between a core layer 302, an aggregate layer 304, a rack layer 306, and a communication device pair 310. The core layer 302 may include switches at a top level of a network managing traffic. The aggregate layer 304 may include switches at a middle level of the network managing traffic. The rack layer 306 may include switches at a bottom level of the network managing traffic. The communication device pair 310 may include a node device 312 and another node device communicating with each other.

In a network oversubscription scenario, PS-N approach may be managed to achieve proportional fairness in bandwidth allocation within the network. PS-N may be executed at a rack layer 306 to manage the network traffic because the network traffic is routed through one or more links associated with the rack layer 306 or a rack link. As such, PS-N may be unaware of bottleneck links at the core layer 302 and the aggregate layer 304. The bandwidth allocated to the rack link may exceed a capacity of one or more links associated with the core layer 302 or a core link or the capacity of one or more links associated with the aggregate layer 304 or an aggregate link. The bandwidth computed for the rack link may be decreased to meet a bandwidth of the bottleneck link. The re-allocated bandwidth may no longer satisfy equation (3), as such resulting in unfairness of bandwidth allocation.

A persistence proportional sharing at the network level (PPS-N) approach may overcome the deficiencies of PS-N. PPS-N is based on PS-N. PPS-N may allocate bandwidth based on the bottleneck link so that total bandwidth of the communication device pairs at other layers may not exceed associated link capacities. In an example scenario, the core layer 302 may include the bottleneck links, $L_{C\text{-}1}$ 218 and $L_{C\text{-}2}$ 220. The bandwidth allocated to communication device pairs, which are communicating through the bottleneck links, may be computed as:

$$BW_{i\text{-}j}=BW_{i\text{-}j\in L_\lambda}, L_\lambda \in L_{bottleneck} \quad (6)$$

The bandwidth allocation of the communication device pairs unable to communicate through the bottleneck links may computed based on a weight proportionality:

$$BW_{x\leftrightarrow y}=w_x\leftrightarrow_y/w_i\leftrightarrow_x BW_{i\leftrightarrow j\in L_\lambda}, x\leftrightarrow y\notin L_{bottleneck} \quad (7)$$

In addition, based on a definition of a bottleneck link in equation (1), the bottleneck links may be computed as:

$$L_{bottleneck}=\min\left\{\frac{BW_{available/L}}{\sum_{i,j\in V_x i\neq j,i\leftrightarrow j\in L}\left(\frac{W_{x_i}}{N_{x_i}}+\frac{W_{x_j}}{N_{x_j}}\right)}, L\in\{L_1, L_2 \ldots L_n\}\right\} \quad (8)$$

In further embodiments, a bandwidth efficiency persistence proportional sharing at network level (BEPPS-N) approach may be deployed to alleviate low bandwidth efficiency at the network. BEPPS-N may increase a bandwidth allocation to communication device pairs, which do not pass through bottleneck links (also known as unblocked pairs); BEPPS-N may also maintain a proportionality of the bandwidth allocation at the customer level. A communication device pair that passes through a bottleneck link is known as a blocked pair. The blocked pairs may be constrained by equation (6). In order to achieve proportionality at the communication device level in PPS-N, bandwidth assigned to other communication device pairs (unblocked pairs) may be constrained by the bandwidth allocated to the blocked pairs.

BEPPS-N may allow available bandwidth of non-bottleneck links to be allocated to the blocked pairs to achieve customer fairness. The total allocated bandwidth of the customers may be proportional to associated weights. BEPPS-N may no longer maintain proportional fairness for the communication device pair because bandwidth assigned to the communication device pair may not be proportional to an associated weight value. Additional bandwidth may be assigned to the unblocked pairs manually.

In an example scenario that uses the tree-based network topology of the diagram 200, the core layer 202 and the aggregate layer 204 may be oversubscribed by four times. A core link may be the bottleneck link after all communication device pairs are allocated bandwidth by a PPS-N approach. The customers A and B 214 may have an equal weight according to the example scenario. Bandwidth for the customers A and B 214 may be increased to improve the bandwidth utilization. An increment of the bandwidth for the customers A and B 214 may be $\Delta B$. The increment may be allocated to the communication device pairs that pass through uncongested links.

The allocation of $\Delta B$ may depend on the network topology. A total bandwidth assignment to communication device pairs on a link may not exceed the link's capacity while applying BEPPS-N to a specific network topology (such as tree-based topology). At the core layer 202, the increment $\Delta B$ of a customer B may not exceed the bandwidth allocated to the customer A in the PPS-N approach.

$$\Delta B_C \leq \Sigma_{AiAj \in L_{core}} BW_{AiAj} \qquad (9)$$

in which $L_{core}$ may represent communication device pairs that communicate through a core link. $BW_{AiAj}$ may define a weight of the communication device pair between $VM_{Ai}$ and $VM_{Aj}$.

In addition, for any link on the aggregate layer 304, $$\Delta B_a \times \frac{\sum_{BiBj \in (L_{agg} \cap L_{bottleneck})} W_{BiBj}}{\sum_{BiBj \in L_{bottleneck}} W_{BiBj}} - \Delta B_a \frac{\sum_{AiAj \in (L_{agg} \cap L_{bottleneck})} W_{AiAj}}{\sum_{AiAj \in L_{bottleneck}} W_{AiAj}} + \qquad (10)$$

$$2 \times \Delta B_a \times \frac{\sum_{AiAj \in (L_{agg} \oplus L_{parent})} W_{AiAj}}{\sum_{AiAj \in L_{bottleneck}} W_{AiAj}} \leq BW_{agg-left}$$

in which $L_{agg}$ may represent communication device pairs that communicate through an aggregate link. $L_{parent}$ may include communication device pairs of a parent link of the aggregate link. The parent link of $L_{A-1}$ (222) may be determined to include $L_{C-1}$ in order to compute a maximum value of $\Delta B_a$ on the link $L_{A-1}$. In addition, $L_{parent} = \{A_1A_5, A_1A_6, A_1A_7, A_1A_8 \ldots\}$. $L_{bottleneck}$ may include the communication device pairs on the bottleneck links. In addition, $BW_{agg-left}$ may represent the available bandwidth of an aggregate link after execution of the PPS-N approach.

Any link on the rack layer 206, $$\Delta B_r \times \frac{\sum_{BiBj \in (L_{rack} \cap L_{bottleneck})} W_{BiBj}}{\sum_{BiBj \in L_{bottleneck}} W_{BiBj}} - \Delta B_r \frac{\sum_{AiAj \in (L_{rack} \cap L_{bottleneck})} W_{AiAj}}{\sum_{AiAj \in L_{bottleneck}} W_{AiAj}} + \qquad (11)$$

$$2 \times \Delta B_r \times \frac{\sum_{AiAj \in (L_{rack} \oplus L_{father})} W_{AiAj}}{\sum_{AiAj \in L_{bottleneck}} W_{AiAj}} \leq BW_{rack-left}$$

in which $L_{rack}$ may represent communication device pairs communicating through a rack link. $BW_{rack-left}$ may include available bandwidth at the rack link after execution of the PPS-N approach. As such, the value of $\Delta B$ in the network may be min $\{\max(\Delta Bc), \max(\Delta Br), \max(\Delta Ba)\}$.

Embodiments may be implemented via combinations of hardware and software components. The software components may operate with communication or signaling systems, to manage bandwidth efficiency and fairness in cloud computing. Moreover, embodiments are not limited to wired and/or wireless systems, but may be implemented in any measurement/determination device/application used in any electronics system that uses the measurement/determination device/application such as wireless networks, speech processors, (medical) image processors, and similar ones.

While embodiments have been discussed above using specific examples, components, scenarios, and configurations in FIG. 1, FIG. 2, and FIG. 3 they are intended to provide a general guideline to be used to manage bandwidth efficiency and fairness in cloud computing. These examples do not constitute a limitation on the embodiments, which may be implemented using other components, optimization schemes, and configurations using the principles described herein. For example, other approaches may be implemented than those provided as example.

Figure 4:
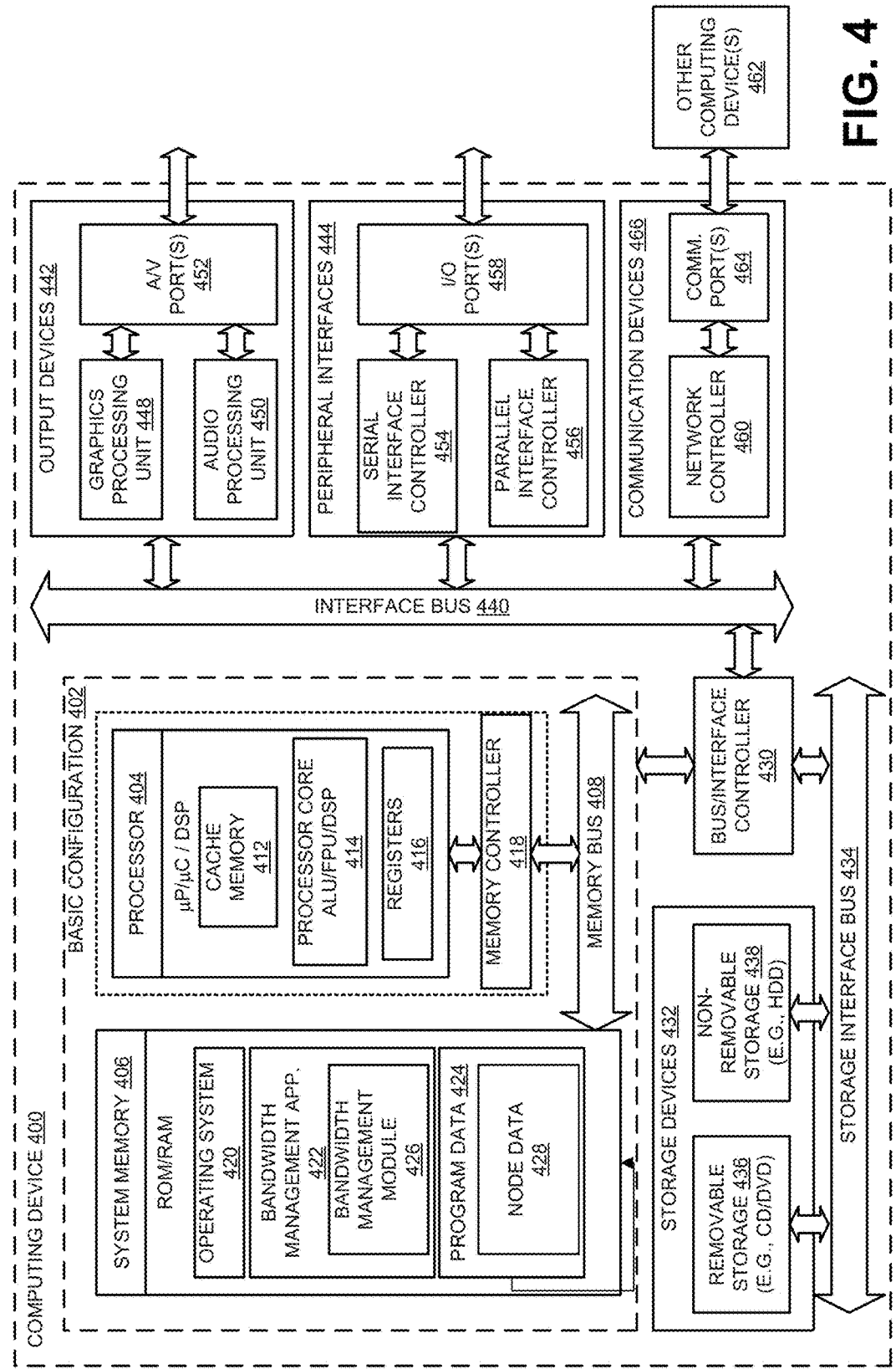
FIG. 4 illustrates a general purpose computing device, which may be used to manage bandwidth efficiency and fairness in cloud computing.

FIG. 4 illustrates a general purpose computing device, which may be used to manage bandwidth efficiency and fairness in cloud computing, arranged in accordance with at least some embodiments described herein. The computing device 400 of FIG. 4 may be one or more of a core switch 208, an aggregate switch 210, and a rack switch 212, or some other device that is not shown in FIG. 2. In a very basic configuration 402, computing device 400 typically includes one or more processors 404 and a system memory 406. A memory bus 408 may be used for communicating between processor 404 and system memory 406.

Depending on a particular configuration, processor 404 may be of any type including but not limited to a microprocessor (µP), a microcontroller (µC), a Digital Signal Processor (DSP), or any combination thereof. Processor 404 may include one or more levels of caching, such as a cache memory 412, a processor core 414, and registers 416. Example processor core 414 may include an Arithmetic Logic Unit (ALU), a floating point unit (FPU), a Digital Signal Processing core (DSP core), or any combination thereof. An example memory controller 418 may also be used with processor 404, or in some implementations, memory controller 418 may be an internal part of processor 404.

Depending on the particular configuration, system memory 406 may be of any type including but not limited to volatile memory (such as RAM), non-volatile memory (such as ROM, flash memory, etc.) or any combination thereof. System memory 406 may include an operating system 420, one or more bandwidth management applications 422, and program data 424. The bandwidth management application 422 may include a bandwidth management module 426 that is arranged to manage bandwidth efficiency and fairness in cloud computing. Program data 424 may include one or more of node data 428 and similar data as discussed above in conjunction with at least FIGS. 1, 2, and 3. This data may be useful for management of bandwidth efficiency and fairness in cloud computing as is described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by computing device 400. Any such computer storage media may be part of computing device 400.

Computing device 400 may also include an interface bus 440 for facilitating communication from various interface devices (for example, output devices 442, peripheral interfaces 444, and communication devices 466 to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover, computing device 400 may be implemented as a networked system or as part of a general purpose or specialized server.

Networks for a networked system including computing device 400 may comprise any topology of servers, clients, switches, routers, modems, Internet service providers, and any appropriate communication media (for example, wired or wireless communications). A system according to embodiments may have a static or dynamic network topology. The networks may include a secure network such as an enterprise network (for example, a LAN, WAN, or WLAN), an unsecure network such as a wireless open network (for example, IEEE 802.11 wireless networks), or a world-wide network such (for example, the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
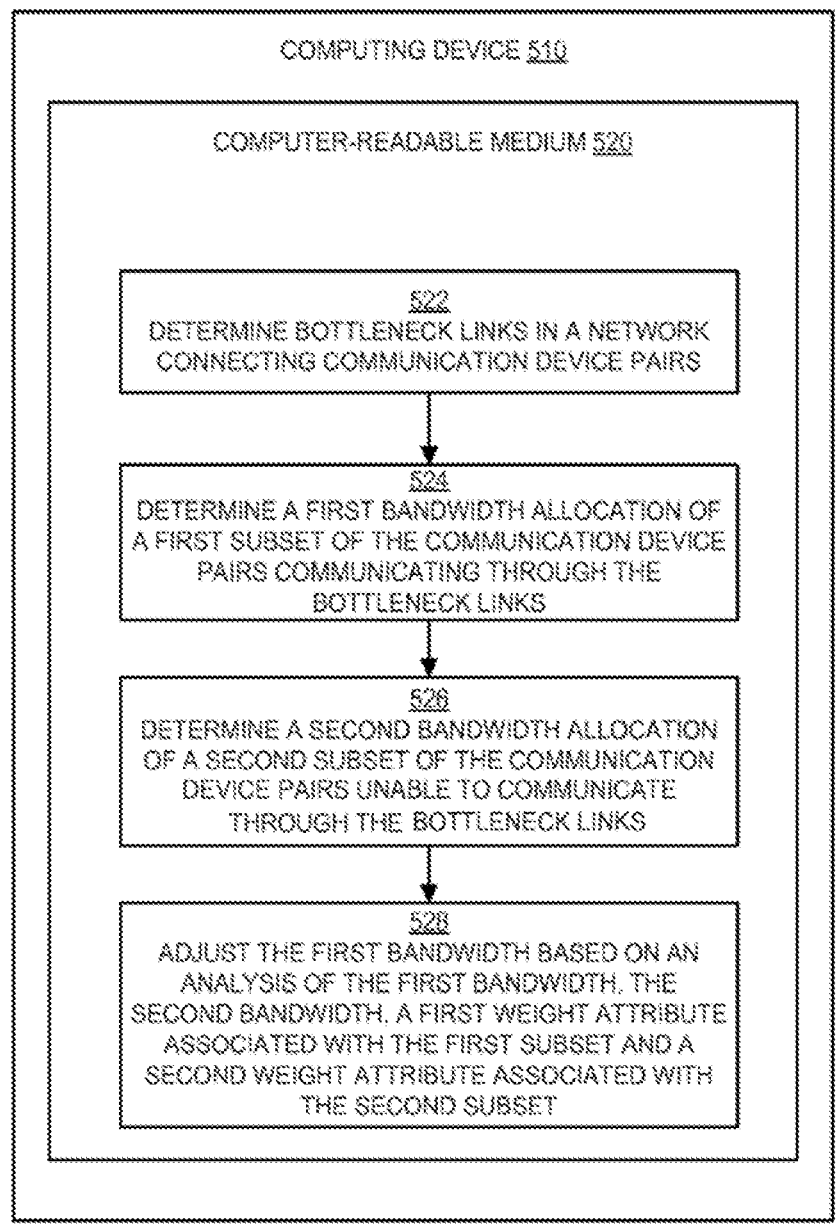
FIG. 5 is a flow diagram illustrating an example method to manage bandwidth efficiency and fairness in cloud computing.

FIG. 5 is a flow diagram illustrating an example method to manage bandwidth efficiency and fairness in cloud computing that may be performed by a computing device 510, such as the computing device 400 in FIG. 4, arranged in accordance with at least some embodiments described herein.

Thus, computing device 510 may be embodied as computing device 400, or similar devices executing instructions stored in a non-transitory computer-readable medium 520 for performing the method. A process to manage bandwidth efficiency and fairness in cloud computing may include one or more operations, functions or actions as is illustrated by one or more of blocks 522, 524, 526, and/or 528.

Some example processes may begin with operation 522, "DETERMINE BOTTLENECK LINKS IN A NETWORK CONNECTING COMMUNICATION DEVICE PAIRS." At operation 522, a computing device 400 may detect communication device pairs unable to communicate through links at a network.

Operation 522 may be followed by operation 524, "DETERMINE A FIRST BANDWIDTH ALLOCATION OF A FIRST SUBSET OF THE COMMUNICATION DEVICE PAIRS COMMUNICATING THROUGH THE BOTTLENECK LINKS." At operation 524, the computing device 400 may compute the first bandwidth allocation through a PS-N approach.

Operation 524 may be followed by operation 526, "DETERMINE A SECOND BANDWIDTH ALLOCATION OF A SECOND SUBSET OF THE COMMUNICATION DEVICE PAIRS UNABLE TO COMMUNICATE THROUGH THE BOTTLENECK LINKS." At operation 526, the computing device 400 may compute the second bandwidth allocation using the PPS-N approach or BEPPS-N approach.

Operation 526 may be followed by operation 528, "ADJUST THE FIRST BANDWIDTH BASED ON AN ANALYSIS OF THE FIRST BANDWIDTH, THE SECOND BANDWIDTH, A FIRST WEIGHT ATTRIBUTE ASSOCIATED WITH THE FIRST SUBSET AND A SECOND WEIGHT ATTRIBUTE ASSOCIATED WITH THE SECOND SUBSET." At operation 528, the computing device 400 may adjust the first bandwidth and the second bandwidth to allow second subset to communication through the bottleneck links.

Figure 6:
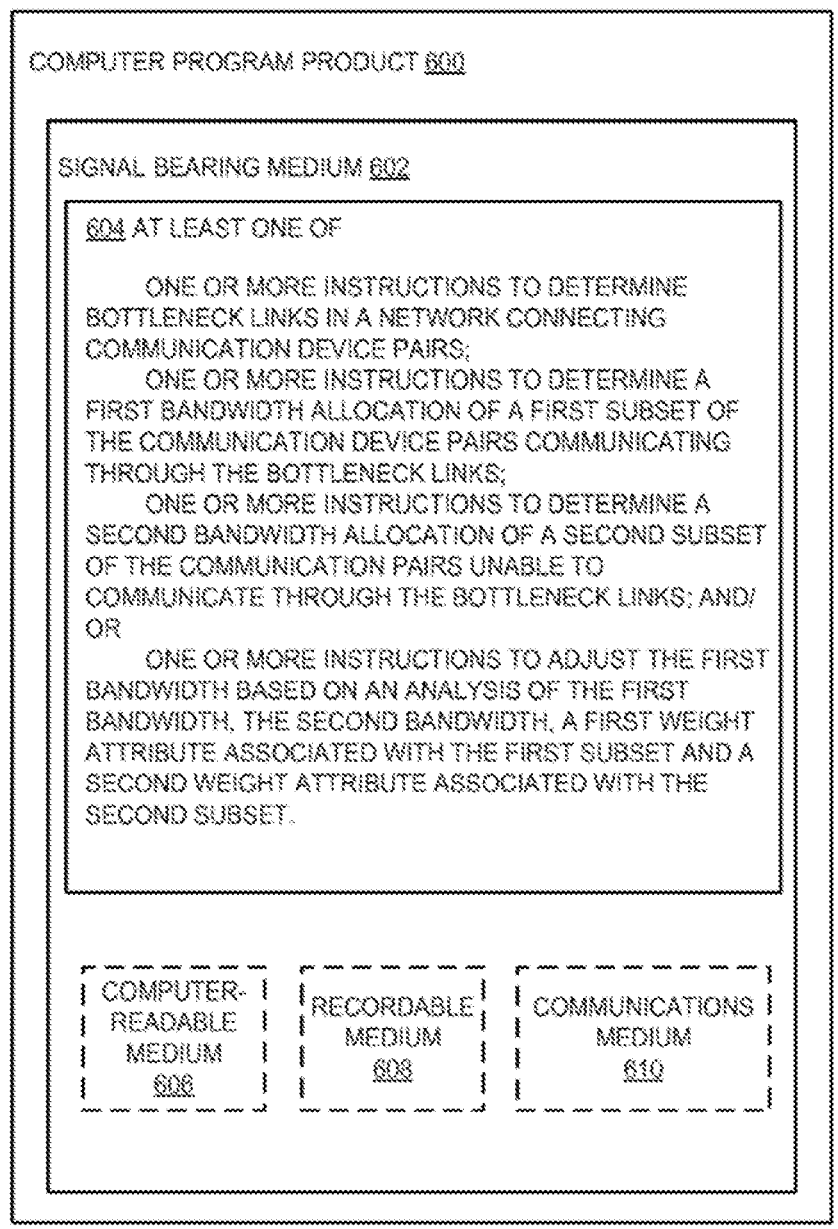
FIG. 6 illustrates a block diagram of an example computer program product to manage bandwidth efficiency and fairness in cloud computing, all arranged in accordance with at least some embodiments described herein.

FIG. 6 illustrates a block diagram of an example computer program product to manage bandwidth efficiency and fairness in cloud computing, arranged in accordance with some embodiments herein.

In some examples, as shown in FIG. 6, computer program product 600 may include a signal bearing medium 602 that may also include machine readable instructions 604 that, in response to execution by, for example, a processor, may provide the functionality described above with respect to FIG. 1 through FIG. 5. Thus, for example, referring to computing device 400, one or more of the tasks shown in FIG. 6 may be undertaken in response to instructions 604 conveyed to the computing device 400 by signal bearing medium 602 to perform actions associated with management of bandwidth efficiency and fairness in cloud computing as described herein. Some of those instructions may include determining bottleneck links in a network connecting communication device pairs, determining a first bandwidth allocation of a first subset of the communication device pairs communicating through the bottleneck links, determining a second bandwidth allocation of a second subset of the communication device pairs unable to communicate through the bottleneck links, and adjusting the first bandwidth based on an analysis of the first bandwidth, the second bandwidth, a first weight attribute associated with the first subset and a second weight attribute associated with the second subset.

In some implementations, signal bearing medium 602 depicted in FIG. 6 may encompass a non-transitory computer-readable medium 606, such as, but not limited to, a hard disk drive (HDD), a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (for example, a fiber optic cable, a waveguide, a wired communications link, a wireless communication link, etc.). Thus, for example, computer program product 600 may be conveyed to the processor 404 by an RF signal bearing medium 602, where the signal bearing medium 602 is conveyed by a wireless communications medium 610 (for example, a wireless communications medium conforming with the IEEE 802.11 standard).

According to some examples, a method is provided to manage bandwidth efficiency and fairness in cloud computing. An example method may include determining bottleneck links in a network connecting communication device pairs, determining a first bandwidth allocation of a first subset of the communication device pairs communicating through the bottleneck links, determining a second bandwidth allocation of a second subset of the communication device pairs unable to communicate through the bottleneck links, and adjusting the first bandwidth based on an analysis of the first bandwidth, the second bandwidth, a first weight attribute associated with the first subset and a second weight attribute associated with the second subset.

According to other examples, the bottleneck links may include at least one from a set of a core link, an aggregate link, and a rack link. The core link is a parent link of the aggregate link, and the aggregate link is another parent link of the rack link. The first bandwidth allocation and the second bandwidth allocation include a core bandwidth allocation, an aggregate bandwidth allocation, and a rack bandwidth allocation. The core bandwidth allocation is a first aggregate value of links associated with node devices at a top level of the network, the aggregate bandwidth allocation is a second aggregate value of links associated with node devices at a middle level of the network, and the rack bandwidth allocation is a third aggregate value of links associated with node devices at a bottom level of the network.

According to other examples, the method may further include determining a first aggregate value of a rack bandwidth allocation of the first subset, and determining a second aggregate value of another rack bandwidth allocation of the second subset. A ratio value may be computed by comparing the first aggregate value to the second aggregate value, the second bandwidth allocation may be increased according to the ratio value and the second weight attribute, and the first bandwidth allocation may be decreased according to the ratio value and the first weight attribute.

According to further examples, a first aggregate value may be determined of an aggregate bandwidth allocation of the first subset, and a second aggregate value may be determined of another aggregate bandwidth allocation of the second subset. A ratio value may be computed by comparing the first aggregate value to the second aggregate value, the second bandwidth allocation may be increased according to the ratio value and the second weight attribute, and the first bandwidth allocation may be decreased according to the ratio value and the first weight attribute. The first bandwidth allocation and the second bandwidth allocation may be maintained below a capacity threshold associated with the bottleneck links.

According to other examples, an apparatus is provided to manage bandwidth efficiency and fairness in cloud computing. The apparatus may include a bandwidth management module configured to manage bandwidth of network nodes and a processor coupled to the bandwidth management module. The processor may be configured to determine bottleneck links in a network connecting communication device pairs, wherein the bottleneck links include at least one from a set of a core link, an aggregate link, and a rack link, determine a first bandwidth allocation of a first subset of the communication device pairs communicating through the bottleneck links, determine a second bandwidth allocation of a second subset of the communication device pairs unable to communicate through the bottleneck links, and adjust the first bandwidth based on an analysis of the first bandwidth, the second bandwidth, a first weight attribute associated with the first subset and a second weight attribute associated with the second subset.

According to some examples, the core link is a parent link of the aggregate link, and the aggregate link is another parent link of the rack link. The first bandwidth allocation and the second bandwidth allocation include a core bandwidth allocation, an aggregate bandwidth allocation, a rack bandwidth allocation, and the core bandwidth allocation is a first aggregate value of links associated with node devices at a top level of the network, the aggregate bandwidth allocation is a second aggregate value of links associated with node devices at a middle level of the network, and the rack bandwidth allocation is a third aggregate value of links associated with node devices at a bottom level of the network.

According to further examples, the processor may be further configured to determine a first aggregate value of a rack bandwidth allocation of the first subset and determine a second aggregate value of another rack bandwidth allocation of the second subset. A ratio value may be computed by comparing the first aggregate value to the second aggregate value, the second bandwidth allocation may be increased according to the ratio value and the second weight attribute, and the first bandwidth allocation may be decreased according to the ratio value and the first weight attribute.

According to yet other examples, the processor may be further configured to determine a first aggregate value of an aggregate bandwidth allocation of the first subset and determine a second aggregate value of another aggregate bandwidth allocation of the second subset. A ratio value may be computed by comparing the first aggregate value to the second aggregate value, the second bandwidth allocation may be increased according to the ratio value and the second weight attribute, and the first bandwidth allocation may be decreased according to the ratio value and the first weight attribute. The first bandwidth allocation and the second bandwidth allocation may be maintained below a capacity threshold associated with the bottleneck links.

According to other examples, a system including a controller is provided to manage bandwidth efficiency and fairness in cloud computing. The controller may be configured to determine bottleneck links in a network connecting communication device pairs, wherein the bottleneck links include at least one from a set of a core link, an aggregate link, a rack link, and the core link is a parent link of the aggregate link, and the aggregate link is another parent link of the rack link, determine a first bandwidth allocation of a first subset of the communication device pairs communicating through the bottleneck links, determine a second bandwidth allocation of a second subset of the communication device pairs unable to communicate through the bottleneck links, and adjust the first bandwidth based on an analysis of the first bandwidth, the second bandwidth, a first weight attribute associated with the first subset, and a second weight attribute associated with the second subset.

According to some examples, the first bandwidth allocation and the second bandwidth allocation include a core bandwidth allocation, an aggregate bandwidth allocation, a rack bandwidth allocation, and the core bandwidth allocation is a first aggregate value of links associated with node devices at a top level of the network, the aggregate bandwidth allocation is a second aggregate value of links associated with node devices at a middle level of the network, and the rack bandwidth allocation is a third aggregate value of links associated with node devices at a bottom level of the network.

According to further examples, the controller may further be configured to determine a first aggregate value of a rack bandwidth allocation of the first subset, determine a second aggregate value of another rack bandwidth allocation of the second subset, compute a ratio value by comparing the first aggregate value to the second aggregate value, increase the second bandwidth allocation according to the ratio value and the second weight attribute, and decrease the first bandwidth allocation according to the ratio value and the first weight attribute.

According to yet other examples, the controller may further be configured to determine a first aggregate value of an aggregate bandwidth allocation of the first subset, determine a second aggregate value of another aggregate bandwidth allocation of the second subset, compute a ratio value by comparing the first aggregate value to the second aggregate value, increase the second bandwidth allocation according to the ratio value and the second weight attribute, and decrease the first bandwidth allocation according to the ratio value and the first weight attribute. The first bandwidth allocation and the second bandwidth allocation may be maintained below a capacity threshold associated with the bottleneck links.

According to yet further examples, a computer-readable storage medium may be provided to manage bandwidth efficiency and fairness in cloud computing. The instructions, in response to execution by a processor, causing the method to be performed in response to execution by a processor, the method being similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs). Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof.

Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to manage bandwidth efficiency and fairness in cloud computing, the method comprising:
    determining, by one of a core switch, a rack switch, and an aggregate switch of a layered datacenter communication network that communicatively couples communication device pairs and that is configured to facilitate communication between the communication device pairs, a bottleneck link in the layered datacenter communication network;
    determining, by one of the core switch, the rack switch, and the aggregate switch, a first bandwidth allocation of a first subset of the communication device pairs that communicate through the bottleneck link;
    determining, by one of the core switch, the rack switch, and the aggregate switch, a second bandwidth allocation of a second subset of the communication device pairs that communicate through another link in the layered datacenter communication network;
    computing, by one of the core switch, the rack switch, and the aggregate switch:
        a first weight attribute associated with the first subset of the communication device pairs based on a first number of other communication device pairs in communication with the first subset of the communication device pairs through the layered datacenter communication network, and based on a first weight of each communication device within the first subset of the communication device pairs; and
        a second weight attribute associated with the second subset of the communication device pairs based on a second number of other communication device pairs in communication with the second subset of the communication device pairs through the layered datacenter communication network, and based on a second weight of each communication device within the second subset of the communication device pairs; and
    assigning, by one of the core switch, the rack switch, and the aggregate switch, a portion of the first bandwidth allocation to the second subset of the communication device pairs in addition to the second bandwidth allocation already assigned to the second subset of the communication device pairs such that total allocated bandwidths to the first subset of the communication device pairs and the second subset of the communication device pairs are proportional to the first weight attribute and the second weight attribute respectively associated with the first subset of the communication device pairs and the second subset of the communication device pairs.

2. The method of claim 1, wherein determining the bottleneck link includes determining a bottleneck link that includes at least one from a set of a core link, an aggregate link, and a rack link, and wherein the core link communicatively couples the core switch to a plurality of aggregate switches, the aggregate link communicatively couples each of the plurality of aggregate switches to a plurality of rack switches, and the rack link communicatively couples each of the plurality of rack switches to the communication device pairs.

3. The method of claim 2, wherein the core link includes a parent link of the aggregate link, and the aggregate link includes another parent link of the rack link.

4. The method of claim 1, wherein determining the first bandwidth allocation and the second bandwidth allocation includes determining a core bandwidth allocation, an aggregate bandwidth allocation, and a rack bandwidth allocation.

5. The method of claim 4, wherein determining the core bandwidth allocation includes determining a first aggregate value of links associated with node devices at a top level of the layered datacenter communication network, wherein determining the aggregate bandwidth allocation includes determining a second aggregate value of links associated with node devices at a middle level of the layered datacenter communication network, and wherein determining the rack bandwidth allocation includes determining a third aggregate value of links associated with node devices at a bottom level of the layered datacenter communication network.

6. The method of claim 1, wherein determining the first bandwidth allocation and the second bandwidth allocation includes:
    determining a first aggregate value of a rack bandwidth allocation of the first subset; and
    determining a second aggregate value of another rack bandwidth allocation of the second subset.

7. The method of claim 6, further comprising:
    computing a ratio value by comparing the first aggregate value to the second aggregate value;
    increasing the second bandwidth allocation according to the ratio value and the second weight attribute; and
    decreasing the first bandwidth allocation according to the ratio value and the first weight attribute.

8. The method of claim 1, further comprising:
    determining a first aggregate value of an aggregate bandwidth allocation of the first subset; and
    determining a second aggregate value of another aggregate bandwidth allocation of the second subset.

9. The method of claim 8, further comprising:
    computing a ratio value by comparing the first aggregate value to the second aggregate value;
    increasing the second bandwidth allocation according to the ratio value and the second weight attribute; and
    decreasing the first bandwidth allocation according to the ratio value and the first weight attribute.

10. The method of claim 1, further comprising:
    maintaining the first bandwidth allocation and the second bandwidth allocation below a capacity threshold associated with the bottleneck link.

11. A switch to manage bandwidth efficiency and fairness in cloud computing, the switch comprising:
    a memory configured to store instructions, wherein the instructions facilitate management of bandwidth for communication through a network that communicatively couples communication device pairs; and a processor coupled to the memory, wherein the processor is configured to execute the stored instructions to perform or cause to be performed:

determine a bottleneck link in the network, wherein the bottleneck link includes at least one from a set of a core link, an aggregate link, and a rack link;

determine a first bandwidth allocation of a first subset of the communication device pairs that communicate through the bottleneck link;

determine a second bandwidth allocation of a second subset of the communication device pairs that communicate through another link in the network;

compute, by one of a core switch, a rack switch, and an aggregate switch:

a first weight attribute associated with the first subset of the communication device pairs based on a first number of other communication device pairs in communication with the first subset of the communication device pairs through the network, and based on a first weight of each communication device within the first subset of the communication device pairs; and a second weight attribute associated with the second subset of the communication device pairs based on a second number of other communication device pairs in communication with the second subset of the communication device pairs through the network, and based on a second weight of each communication device within the second subset of the communication device pairs; and assign a portion of the first bandwidth allocation to the second subset of the communication device pairs in addition to the second bandwidth allocation already assigned to the second subset of the communication device pairs such that total allocated bandwidths to the first subset of the communication device pairs and the second subset of the communication device pairs are proportional to the first weight attribute and the second weight attribute respectively associated with the first subset of the communication device pairs and the second subset of the communication device pairs.

12. The switch according to claim 11, wherein the switch includes one of a core switch, a rack switch, and an aggregate switch.

13. The switch according to claim 11, wherein the first bandwidth allocation and the second bandwidth allocation include a core bandwidth allocation, an aggregate bandwidth allocation, and a rack bandwidth allocation, and wherein the core bandwidth allocation includes a first aggregate value of links associated with node devices at atop level of the network, the aggregate bandwidth allocation includes a second aggregate value of links associated with node devices at a middle level of the network, and the rack bandwidth allocation includes a third aggregate value of links associated with node devices at a bottom level of the network.

14. The switch according to claim 11, wherein the processor is configured to execute the stored instructions to perform or cause to be performed:

determine a first aggregate value of a rack bandwidth allocation of the first subset; and determine a second aggregate value of another rack bandwidth allocation of the second subset.

15. The switch according to claim 14, wherein the processor is configured to execute the stored instructions to perform or cause to be performed:

compute a ratio value by comparison of the first aggregate value to the second aggregate value;

increase the second bandwidth allocation according to the ratio value and the second weight attribute; and decrease the first bandwidth allocation according to the ratio value and the first weight attribute.

16. The switch according to claim 11, wherein the processor is configured to execute the stored instructions to perform or cause to be performed:

determine a first aggregate value of an aggregate bandwidth allocation of the first subset; and determine a second aggregate value of another aggregate bandwidth allocation of the second subset.

17. The switch according to claim 16, wherein the processor is configured to execute the stored instructions to perform or cause to be performed:

compute a ratio value by comparison of the first aggregate value to the second aggregate value;

increase the second bandwidth allocation according to the ratio value and the second weight attribute; and decrease the first bandwidth allocation according to the ratio value and the first weight attribute.

18. The switch according to claim 11, wherein the processor is configured to execute the stored instructions to perform or cause to be performed:

maintain the first bandwidth allocation and the second bandwidth allocation below a capacity threshold associated with the bottleneck link.

19. A datacenter to manage bandwidth efficiency and fairness in cloud computing, the datacenter comprising:

communication device pairs; and a plurality of switches configured to perform aggregate switch, rack switch, or core switch operations associated with facilitation of communications between the communication device pairs, wherein at least one switch of the plurality of switches comprises:

a memory configured to store instructions; and a processor coupled to the memory, wherein the processor is configured to execute the stored instructions to perform or cause to be performed:

determine a bottleneck link in a network that communicatively couples a first subset of the communication device pairs, wherein the bottleneck link includes at least one from a set of a core link, an aggregate link, and a rack link, and wherein the core link includes a parent link of the aggregate link, and the aggregate link includes another parent link of the rack link;

determine a first bandwidth allocation of the first subset of the communication device pairs that communicate through the bottleneck link;

determine a second bandwidth allocation of a second subset of the communication device pairs that communicate through another link in the network;

compute:

a first weight attribute associated with the first subset of the communication device pairs based on a first number of other communication device pairs in communication with the first subset of the communication device pairs through the network, and based on a first weight of each communication device within the first subset of the communication device pairs; and a second weight attribute associated with the second subset of the communication device pairs based on a second number of other communication device pairs in communication with the second subset of the communication device pairs through the network, and based on a second weight of each communication device within the second subset of the communication device pairs, respectively; and assign a portion of the first bandwidth allocation to the second subset of the communication device pairs in addition to the second bandwidth allocation already assigned to the second subset of the communication device pairs such that total allocated bandwidths to the first subset of the communication device pairs and the second subset of the communication device pairs are proportional to the first weight attribute and the second weight attribute respectively associated with the first subset of the communication device pairs and the second subset of the communication device pairs.

20. The datacenter according to claim 19, wherein the first bandwidth allocation and the second bandwidth allocation include a core bandwidth allocation, an aggregate bandwidth allocation, and a rack bandwidth allocation, and wherein the core bandwidth allocation includes a first aggregate value of links associated with node devices at a top level of the network, the aggregate bandwidth allocation includes a second aggregate value of links associated with node device at middle level of the network, and the rack bandwidth allocation includes a third aggregate value of links associated with node devices at a bottom level of the network.

21. The datacenter according to claim 19, wherein the processor is configured to execute the stored instructions to perform or cause to be performed:
    determine a first aggregate value of a rack bandwidth allocation of the first subset;
    determine a second aggregate value of another rack bandwidth allocation of the second subset;
    compute a ratio value by comparison of the first aggregate value to the second aggregate value;
    increase the second bandwidth allocation according to the ratio value and the second weight attribute; and
    decrease the first bandwidth allocation according to the ratio value and the first weight attribute.

22. The datacenter according to claim 19, wherein the processor is configured to execute the stored instructions to perform or cause to be performed:
    determine a first aggregate value of an aggregate bandwidth allocation of the first subset;
    determine a second aggregate value of another aggregate bandwidth allocation of the second subset;
    compute a ratio value by comparison of the first aggregate value to the second aggregate value;
    increase the second bandwidth allocation according to the ratio value and the second weight attribute; and
    decrease the first bandwidth allocation according to the ratio value and the first weight attribute.

23. The datacenter according to claim 19, wherein the processor is configured to execute the stored instructions to perform or cause to be performed:
    maintain the first bandwidth allocation and the second bandwidth allocation below a capacity threshold associated with the bottleneck link.

* * * * *

UNITED STATES PATENT AND TRADEMARK OFFICE
CERTIFICATE OF CORRECTION

PATENT NO. : 9,742,675 B2
APPLICATION NO. : 14/353266
DATED : August 22, 2017
INVENTOR(S) : Ansari et al.

It is certified that error appears in the above-identified patent and that said Letters Patent is hereby corrected as shown below:

In the Specification

In Column 2, Lines 66-67, delete "computing: and" and insert -- computing; and --, therefor.

In Column 5, Lines 24-35, delete "servers and…traffic" and insert the same at Line 23 after "eight" as a continuation sub-paragraph.

In Column 6, Line 50, delete " $L_{bottleneck} = \min\left\{\frac{BW_{available,L}}{\sum\left(\frac{W_{x,j}}{N_{x,j}} + \frac{W_{x,j}}{N_{x,j}}\right)}, L \in \{L_1, L_2 \ldots L_n\}\right\}$ " and insert -- $L_{bottleneck} = \min\left\{\frac{BW_{available,L}}{\sum\left(\frac{W_{x,j}}{N_{x,j}} + \frac{W_{x,j}}{N_{x,j}}\right)}, L \in \{L_1, L_2 \ldots L_n\}\right\}$ --, therefor.

In Column 11, Line 7, delete "BANDWIDTH. THE" and insert -- BANDWIDTH, THE --, therefor.

In Column 11, Lines 52-53, delete "communications link," and insert -- communication link, --, therefor.

In Column 14, Line 54, delete "(ASICs). Field" and insert -- (ASICs), Field --, therefor.

In Column 16, Line 45, delete "of"two" and insert -- of "two --, therefor.

Signed and Sealed this
Eighth Day of May, 2018

Andrei Iancu
*Director of the United States Patent and Trademark Office*

CERTIFICATE OF CORRECTION (continued)
U.S. Pat. No. 9,742,675 B2

In the Claims

In Column 19, Line 54, in Claim 13, delete "atop" and insert -- a top --, therefor.

In Column 21, Line 9, in Claim 19, delete "pairs, respectively; and" and insert -- pairs; and --, therefor.